United States Patent

[11] 3,586,137

| [72] | Inventor | Gordon W. Kamman<br>Buffalo, N.Y |
|---|---|---|
| [21] | Appl. No | 821,645 |
| [22] | Filed | May 5, 1969 |
| [45] | Patented | June 22, 1971 |
| [73] | Assignee | Heudaille Industries, Inc.<br>Buffalo, N.Y. |

[54] HYDRAULICALLY RELEASABLE LOCKING BRAKES FOR ROTARY DEVICES
14 Claims, 5 Drawing Figs.

[52] U.S. Cl. .................................. 188/170, 188/67, 188/152
[51] Int. Cl. ............................ F16d 65/24
[50] Field of Search ....................... 188/67, 44, 170, 265, 110, 74, 152.86

[56] References Cited
UNITED STATES PATENTS
| 2,455,439 | 12/1948 | Page ............................ | 188/67 |
| 3,150,571 | 9/1964 | Frassetto et al .............. | 188/67 X |
| 3,353,455 | 11/1967 | Berry ............................. | 188/67 X |

*Primary Examiner*—Daune A Reger
*Attorney*—Hill, Sherman, Meroni, Gross & Simpson ABSTRACT: A hydraulically releasable locking brake for rotary devices includes a brakedrum for attachment rigidly to a body which journals a shaft having a portion projecting therefrom and on which is corotatively mounted an annular brakeshoe, the shoe and drum having complementary normally lockingly engaged frustoconical braking surfaces of largest diameter near the body, means on the brakeshoe thrusting toward and against the body to effect normal locking frictional engagement of the braking surfaces and including bearing means enabling relative rotary movement between the brakeshoe and the body, and means for selectively hydraulically unlocking the braking surfaces to enable relative rotation of the shaft and body. Adjustment in the locking braking static holding torque may be effected by adjusting the brakeshoe relative to the brakedrum or by adjusting the brakedrum relative to the brakeshoe.

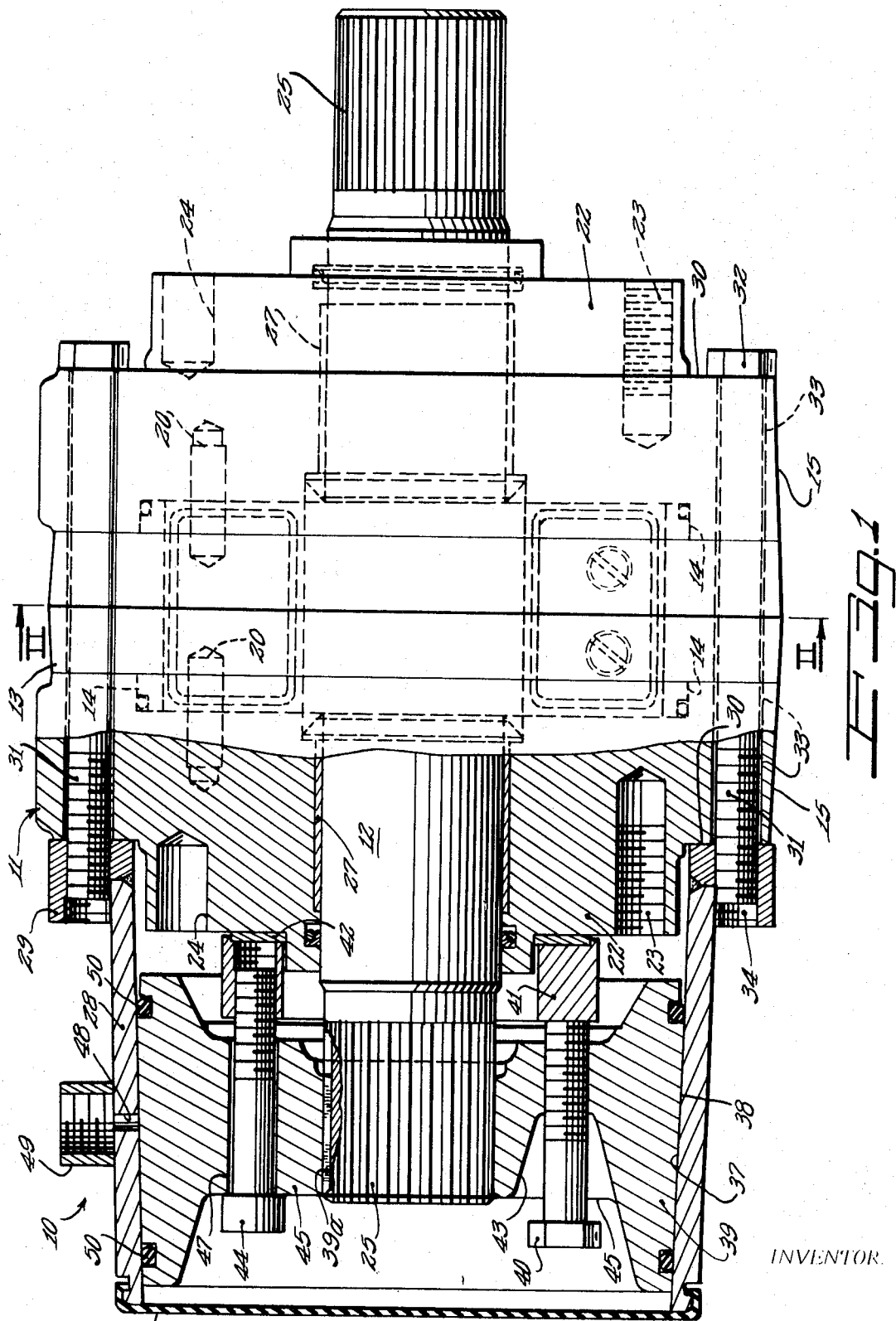

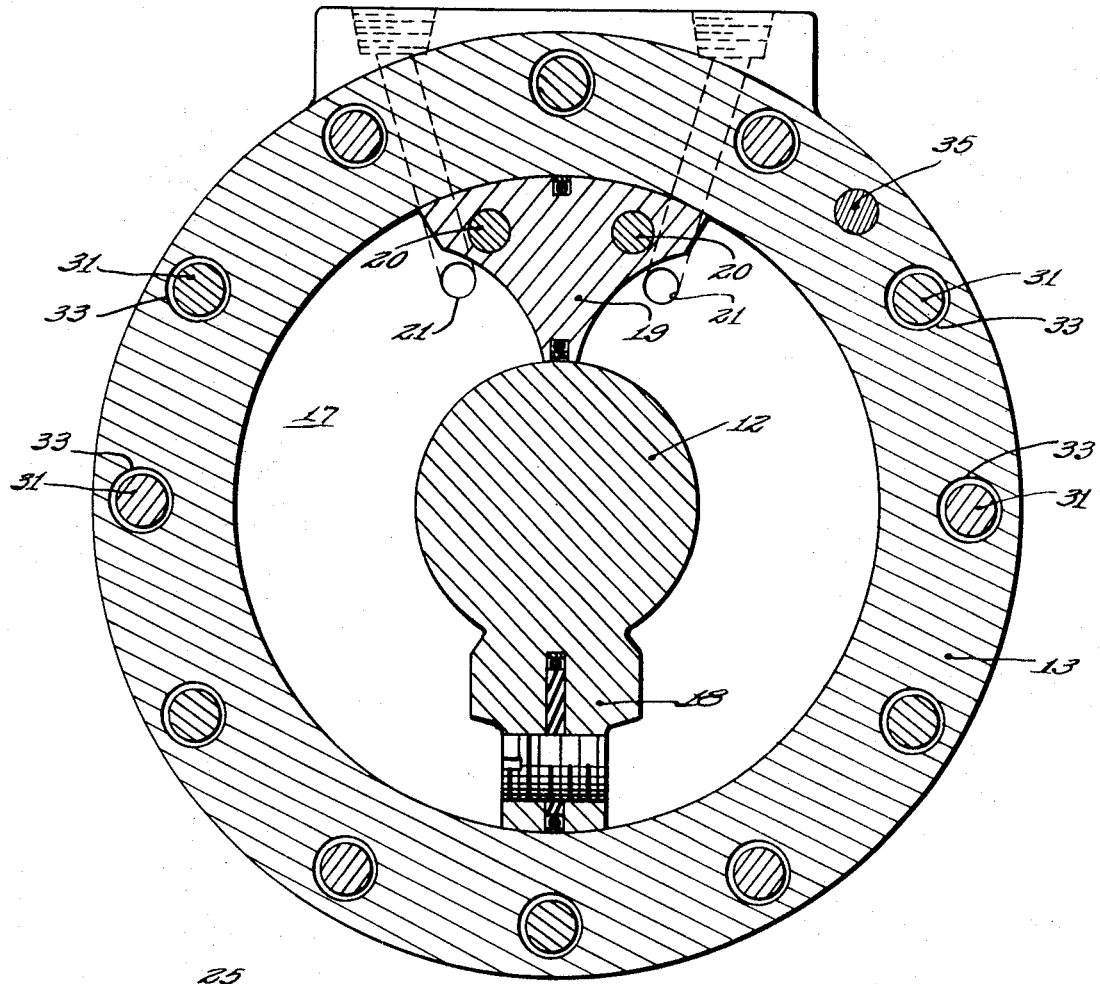
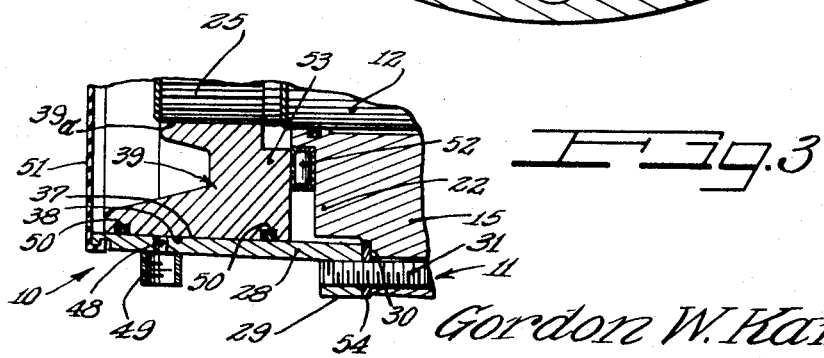

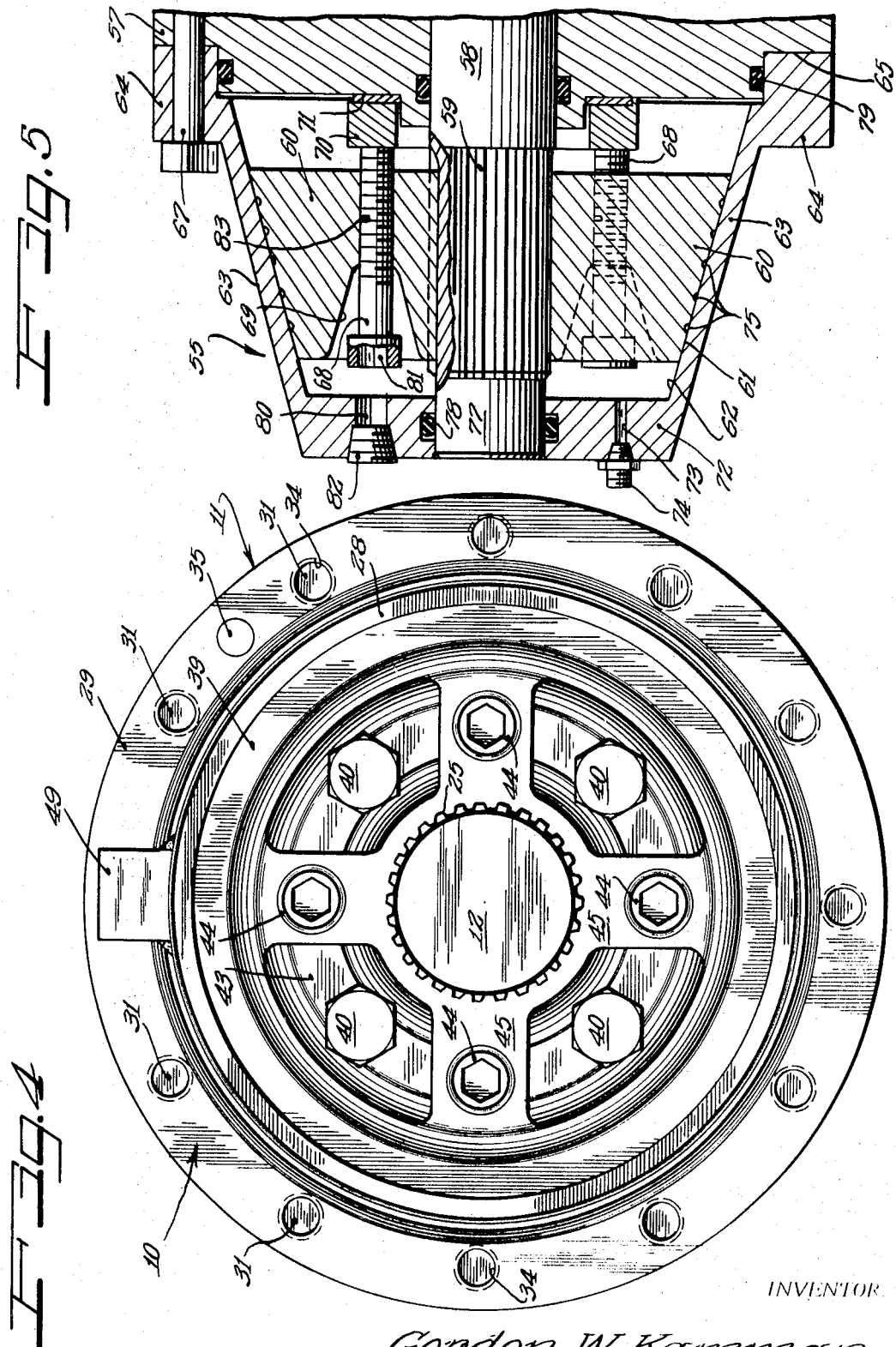

HYDRAULICALLY RELEASABLE LOCKING BRAKES FOR ROTARY DEVICES

This invention relates to improvements in hydraulically releasable locking brakes for rotary devices, such as motors, rotary actuators, and other rotary devices in which a body and a shaft must be held for at least some intervals of time against relative rotation and with a fail-safe positiveness.

Hydraulically releasable interference fit surface holding arrangements are known, as for example, between a sleeve and a shaft. However, this requires an inordinately long area of shaft and interference fit sleeve to attain reasonably high static-holding torque.

Various more compact arrangements including brake drum and shoe structures have been disclosed in Rumsey and Perhach, U.S. Pat. No. 3,379,100, issued Apr. 23, 1968.

It is a principal aim of the present invention to provide a substantially improved, more rugged, simplified, lower cost, highly versatile and efficient hydraulically releasable locking brake of the shaft carried brakeshoe and shaft-journaling body carried brakedrum type.

To this end, an important object of the invention is to provide a new and improved hydraulically releasable locking brake which normally operates with high static-holding torque but has only low dynamic drag when released.

Another object of the invention is to provide a hydraulically releasable locking brake of the shaft carried brakeshoe and shaft-journaling body carried brakedrum type having simple and efficient means for maintaining braking grip of the brakeshoe and the brakedrum.

A further object of the invention is to provide new and improved efficient means for effecting adjustment between the brakeshoe and the brakedrum.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a side elevational view, partially in section of a rotary device having a hydraulically releasable locking brake embodying features of the invention;

FIG. 2 is a diametrical sectional view taken substantially on the line II–II of FIG. 1;

FIG. 3 is a fragmentary longitudinal sectional detail view of a modification;

FIG. 4 is an end elevational view of the brake structure shown in FIG. 1, looking toward the right and with the dust cap removed; and FIG. 5 is a longitudinal sectional view through another modified form of the brake.

By way of example, a hydraulically releasable locking brake 10 according to the principles of the present invention is illustrated (FIGS. 1, 2 and 4) applied to a rotary device in the form of a rotary hydraulic actuator comprising a rugged body 11 journaling a shaft 12. A longitudinally central body ring 13 of the housing has opposite end flanges 14 telescopically joined with preferably substantially identical opposite end closure disc members 15 which cooperate with the body ring to provide a circular working chamber 17 within which one or more and in this instance one integral vane 18 on the shaft 12, functioning as a wingshaft, is oscillatably cooperable with an abutment 19 rigidly fixed across the chamber between the body ring 13 and the periphery of the wingshaft 12 as by means of dowels 20. Introduction and bleedoff of hydraulic fluid in the subchambers of the working chamber 17 as divided by the vane 18 and the abutment 19 are effected selectively through respective ports 21 in one of the end members 15 adapted to be connected into the hydraulic system of the equipment with which the actuator is used. In such equipment, the actuator housing is adapted to be attached to one of the relatively movable members of the apparatus of the equipment, as by securing a respective outer end hub portion 22 of one of the end members to the apparatus by means of bolts thereon run into threaded sockets 23 provided therefore and with one or more torque-relieving dowels extending into sockets 24. Attachment of the wingshaft 12 to the other of the relatively movable members of the apparatus of the equipment to be actuated is effected through attachment thereto of a splined end portion 25 of the wingshaft extending outwardly a suitable distance from the hub portion 22 of one of the end members 15 through which the wingshaft extends and in which it is journaled as by means of respective bearings 27. By virtue of the symmetrical construction disclosed, with each opposite end portion of the shaft extending from its respective journaling end member 15, and splined, the actuator may be selectively attached at either end to the equipment, as may be found most convenient, having regard to various factors including hydraulic circuitry connections, and the like.

During nonoperating periods, the wingshaft 12 is adapted to be held positively stationary relative to the housing 11 by the locking brake means 10 which is constructed and arranged to act normally to maintain the locked condition and which is releasable in response to hydraulic pressure to enable relative rotary or oscillatory working action of the housing and wingshaft. In a high static-holding torque, and low dynamic drag relationship when released, the locking brake 10 comprises a brakedrum 28 having means on one end portion in the form of a flange 29 for attaching it rigidly to the body 11 concentrically with the axis of the shaft 12 and more particularly about one of the shaft end portions 25. In the illustrated instance the flange 29 is shown as welded onto the drum 28 to be functionally integral therewith, but, if preferred, the attachment flange and drum may be constructed in one piece. The diameter of the flange 29 is such as to be engageable against an annular shoulder 30 on the associated end member 15 of the body in stepped relation to the hub portion 22 of that end member and with a set of bolts 31 having heads 32 thereof bearing against the shoulder 30 on the opposite end member 15 and with the shank portions of the bolts extending freely through aligned boltholes 33 in the body members 13 and 15 with respective terminal end portions of the bolts threadedly secured in suitable threaded boltholes 34 in the flange 29 aligned with the boltholes 33. In this manner the flange 29 serves as a clamping flange together with the boltheads 32 to secure the body members 13 and 15 against axial separation and also serves as the attaching means for the brakedrum 28. Desirably dowel means 35 (FIGS. 2 and 4) are provided to facilitate assembly of the several body members and the flange 29 in angular orientation and to maintain them in that orientation even though the bolts 31 may be relatively loosely received through the boltholes 33.

On its inner surface, the brakedrum 28 has an annular frustoconical braking surface 37 of substantial length tapering from a larger diameter at the attachment flange end thereof toward smaller diameter at the opposite end portion of the drum. Frictionally lockingly engageable with the drum surface 37 is a brake surface 38 of substantial width and of complementary frustoconical taper on an annular brake shoe 39 including internal splines 39a for mounting the shoe corotatively on the shaft 12 and more particularly the adjacent splined end portion 25 thereof, with one end of the shoe confronting the body 11.

Means are provided operative between the brakeshoe 39 and the body 11 to thrust the brake shoe axially in the direction of taper of the surfaces 37 and 38 to effect normal locking, holding frictional engagement pressure of the brake surfaces. Desirable means for this purpose comprise bolts 40 (FIGS. 1 and 4) which are threaded axially through the brakeshoe 39 at equally spaced circumferential intervals with their head ends spaced outwardly from the body of the shoe and with their inner terminal ends extending inwardly beyond the inner end of the shoe and engaging a thrust ring 41 which rides on an annular bearing 42 thrusting against the end of the adjacent hub 22. By providing depression clearances 43 in the outer end of the brakeshoe about the bolts 40, the length of the bolts may be minimized and easy access afforded by means of a wrench to be applied to the boltheads for tightening the bolts uniformly thrustingly against the thrust ring 41 to effect a counteracting axial thrust of the brakeshoe 39 in the direction of taper of the surfaces 37 and 38 whereby to attain optimum holding locking interengagement of the brakeshoe and the brakedrum for the particular operating conditions under which the device is to be employed. After the desired adjustment has been effected by means of the bolts 40, locking bolts 44 alternating with the bolts 40 are tightened to maintain the braking adjustment. Each of the locking bolts 44 has its head arranged to clamp against the outer end of the shoe 39 and more particularly against the surface of a radial spoke 45 intervening between the adjacent clearance depressions 43 with the shank of the bolt extending through a free clearance bore 47 and projecting into threaded engagement with the thrust ring 41. Thereby, braking adjustments are readily effected from the outer end of the brake assembly 10 while the bolts 44 are loosened, by adjusting the compression with which the bolts 40 thrust against the thrust ring 41, and then locking of the brake adjustment is effected by tightening the bolts 44.

Release of the brake 10 to enable relative rotation of the housing 11 and the shaft 12 is effected hydraulically to expand the brake drum 28 sufficiently to permit relative slipping rotation of the brakedrum and the brakeshoe. To this end, a port 48 opens through the wall of the brakedrum 28 about longitudinally midway along the lockingly interengaged braking surfaces 37 and 38 and a hydraulic pressure line is adapted to be connected with the port through means such as a nipple 49 on the outside of the brakedrum. Suitable hydraulic pressure introduced through the port 48 to the interface area between the braking surfaces will cause just enough slight expansion of the brakedrum to release the braking grip of the surfaces and enable the relative rotary movement thereof. The hydraulic pressure source may be integrated with the circuit for operating the actuator through the ports 21, or may be separately controlled, as desired. Respective annular sealing rings 50 carried by the brakeshoe 39 at the opposite ends of the braking surface 38 thereon retain the brake releasing hydraulic fluid against escape. A dust cap 51 may be detachably engaged over the outer end of the brake drum 28.

Instead of utilizing bolts to adjust and maintain the braking grip of the braking surfaces 37 and 38, an annular thrust-bearing structure 52 (FIG. 3) may be interposed between the end of the hub 22 and an annular thrust shoulder 53 on the inner end of the brakeshoe 39, and the bolts 31 relied upon to draw the brakedrum 28 through its attachment flange 29 adjustably toward the end of the body 11, with a suitable annular shim 54 interposed between the flange 29 and the shoulder 30 to limit the braking thrust as thus effected by drawing axially inwardly on the brakedrum.

In the modification of FIG. 5, a hydraulically releasable failsafe holding brake 55 is mounted on one end of a body 57 which journals a relatively rotatable shaft 58 having an outwardly projecting splined end portion 59 on which is corotatively mounted a brakeshoe 60 having an annular frustoconically outwardly tapered brake surface 61 adapted to frictionally, holding grip a complementary outwardly tapered frustoconical braking surface 62 on the inside of a generally cup-shaped brakedrum member 63. At its inner end, the brake drum member 63 has a lateral and axially inwardly extending attachment flange 64 which is seated in an annular rabbet 65 in the outer margin of the end face of the body 57. Securing means in the form of bolts 67 extend through the flange 64 and fasten it rigidly to the body 57.

To provide desired braking thrust pressure of the shoe surface against the drum surface, either of the techniques described in respect to the embodiments of FIG. 1 or 3 may be employed. As shown, a set of brake pressure adjusting and maintaining bolts 68 are threaded through the brakeshoe 60 at and through clearance recesses 69 in the outer end face of the brakeshoe and with inner terminal thrusting ends of the bolts pressing against a thrust ring 70, with an annular bearing 71 interposed between the thrust ring and the underlying end face of the body 57.

To release the brake from its high static-holding torque condition to enable low dynamic drag relative rotation of the brakeshoe and brakedrum during relative rotary operation of the housing 57 and shaft 58, hydraulic pressure fluid is adapted to be introduced into the front end of the chamber provided by the brakedrum which for this purpose has a relatively heavy integral end closure 72 with a port 73 therethrough which is adapted to be connected by way of a nipple 74 with a high pressure hydraulic source under suitable control for the intended purpose. Upon introduction of hydraulic pressure into the brakedrum toward the outer end of the brakeshoe, the frustoconical wall of the brakeshoe, which is relatively substantially thinner than the attachment flange 64 and the end closure 72, expands sufficiently to release the brakeshoe. Distribution of the high-pressure hydraulic fluid between the brake surfaces 61 and 62 is facilitated by providing the surface 61 with an axially spaced series of annular oil grooves 75. It will be understood, of course, that similar oil grooves may be provided in the forms of FIGS. 1 and 3 if desired.

In order to minimize any tendency toward end loading of the shaft 58 during brake release, a terminal portion 77 of the shaft is journaled in the end closure 72, with a dynamic ring pressure seal 78 about the terminal shaft portion to prevent leakage. Also to prevent leakage from within the brakedrum chamber, a static ring seal 79 is provided between the body 57 and the attachment flange 64. Any pressure fluid which may leak past the brakeshoe 60 to the area of the chamber therebehind will return past the splined shaft end portion 59 to exhaust through the port 73 when brake unlocking pressure is released, so that the brake may efficiently automatically resume its brake-holding condition.

In order to effect the desired optimum brake-holding pressure adjustment by means of the bolts 68, an access hole 80 is provided in the end closure 72 with which the head ends of the bolts 68 are adapted to be successively aligned so that an end wrench can be inserted through the access hole into respective wrench sockets in the boltheads. After adjustment has been effected a sealing plug 82 is secured in the outer end portion of the access hole. To enable indexing of the respective bolts 68 with the access hole 80, suitable indexing indicia may be provided on the exposed end of the shaft terminal portion 77 and on the adjacent surface of the end closure 72.

To retain the bolts 68 against unintentionally turning out of adjustment, they may be provided with respective thread locks 83. Such a locking means may also be provided for the adjustment bolts 40 alternatively to the locking bolts 44. On the other hand, locking bolts similar to the bolts 44 may be employed auxiliary to the adjustment bolts 68, if desired.

I claim:

1. In a hydraulically releasable locking brake for a rotary device having a body journaling a shaft for relative rotary movement of the shaft and body and with a portion of the shaft projecting from the body:
   a brakedrum having means on one end portion thereof for attaching it rigidly to the body concentrically about said shaft end portion;
   an annular inner frustoconical braking surface of substantial length on said drum tapering from a larger diameter at said one end portion toward smaller diameter at the opposite end portion of the drum;
   an annular brakeshoe including means for mounting it corotatively on said shaft portion with one end of the shoe confronting said body, and having a brake surface of substantial width and of complementary frustoconical taper to and frictionally lockingly engageable with said drum surface;
   means operative between said brakeshoe and said body to thrust the brakeshoe axially in the direction of the taper of said surfaces to effect normal holding frictional engagement pressure of said surfaces;

and means for selectively hydraulically unlocking said braking surfaces, including forcing hydraulic fluid between said braking surfaces, to enable relative rotation of said shaft and body.

2. A brake according to claim 1, dynamic sealing rings between opposite end portions of said braking surfaces, and said means for selectively hydraulically unlocking said braking surfaces comprising a hydraulic pressure port opening through said drum-braking surface between said sealing rings.

3. A brake according to claim 1, said drum having a relatively heavy end closure across its outer end, and said means for selectively hydraulically unlocking the braking surfaces comprising a hydraulic pressure port opening through said end closure to introduce hydraulic pressure into the drum to effect said unlocking.

4. A brake according to claim 1, said means operative to thrust the brakeshoe axially comprising bolts threaded through the brakeshoe and with end portions extending beyond said one end of the brakeshoe, and a thrust ring arranged to bear against said body and against which ring said ends of the bolts press.

5. A brake according to claim 4, said brakeshoe having clearance recesses in its outer end to accommodate said bolts, with intervening radial reinforcing spokes.

6. A brake according to claim 5, including locking bolts extending through said spokes and threadedly engaging said thrust ring and having heads arranged to be tightened against said spokes to lock the brake-adjusting bolts in adjusted condition.

7. A brake according to claim 4, including locking bolts extending through said brakeshoe in alternating relation to said first-mentioned bolts and threaded into said thrust ring and operative to lock the first-mentioned bolts in their adjusted condition.

8. A brake according to claim 1, said means to thrust the brakeshoe axially including an annular shoulder on the inner end of said brakeshoe, and bearing means comprising an annular bearing to be engaged by and interposed between said shoulder and said body.

9. A brake according to claim 8, said brakedrum having an attachment flange on its inner end adapted to be drawn toward the body to effect said relative axial thrusting of said braking surfaces, and said shoulder thrusting against said bearing and effecting said thrusting of the brakeshoe axially in the direction of taper of the braking surfaces.

10. A brake according to claim 1, said brakedrum being of generally cup-shape having an inner annular attachment flange arranged to be secured to said body and an outer end closure which is substantially thicker than an annular tapered wall having thereon said brakedrum braking surface, said brake shoe having spline means to engage spline mans on the end portion of the shaft and said end portion of the shaft being journaled in said end closure, said means for selectively hydraulically unlocking the braking surfaces comprising a hydraulic pressure port through said end closure, means for sealing between the brakedrum and the body and between said end closure and said shaft end portion to prevent leakage from within the brakedrum during brake-releasing pressure, said spline means enabling pressure relief from between the brakeshoe and the body when brake-unlocking pressure is released.

11. A brake according to claim 1, including thrust-bearing means between said brakeshoe and said body facilitating relative rotary movement between said brakeshoe and said body in the rotation of the shaft after the brake has been hydraulically unlocked.

12. A brake according to claim 1, said brakedrum being of generally cup-shape having an inner annular attachment flange arranged to be secured to said body and an outer end closure which is substantially thicker than an annular tapered wall having thereon said brakedrum braking surface, said means for selectively hydraulically unlocking the braking surfaces comprising a hydraulic pressure port through said end closure, and means for sealing between the brakedrum and the body to prevent leakage from within the brakedrum during brake-releasing pressure.

13. A brake according to claim 1, said brakedrum being of generally cup-shape having an inner annular attachment flange arranged to be secured to said body and an outer end closure which is substantially thicker than an annular tapered wall having thereon said brakedrum braking surface, said brakedrum having spline means to engage spline means on the end portion of the shaft, said means for selectively hydraulically unlocking the braking surfaces comprising a hydraulic pressure port through said end closure, and means for sealing between said brakedrum and the body to prevent leakage from within the brakedrum during brake-releasing pressure, said spline means enabling pressure relief from between the brakeshoe and the body when brake-unlocking pressure is released.

14. A brake according to claim 1, said brakedrum being of generally cup-shape having an inner annular attachment flange arranged to be secured to said body and an outer end closure which is substantially thicker than an annular tapered wall having thereon said brakedrum braking surface, said end portion of the shaft being journaled in said end closure, said means for selectively hydraulically unlocking the braking surfaces comprising a hydraulic pressure port through said end closure, and means for sealing between the brakedrum and the body and between said end closure and said shaft end portion to prevent leakage from within the brakedrum during brake-releasing pressure.